United States Patent [19]

Shriver

[11] E Re. 31,064

[45] Reissued Oct. 26, 1982

[54] ADJUSTABLE WIDTH ROW CROP HEADER

[75] Inventor: Joe E. Shriver, New Holland, Pa.

[73] Assignee: Sperry Corporation, New Holland, Pa.

[21] Appl. No.: 184,599

[22] Filed: Sep. 5, 1980

Related U.S. Patent Documents

Reissue of:

[64] Patent No.: 4,086,749
Issued: May 2, 1978
Appl. No.: 714,534
Filed: Aug. 16, 1976

[51] Int. Cl.[3] ..... A01D 14/02

[52] U.S. Cl. ..... 56/98; 56/14.3; 56/106

[58] Field of Search ..... 56/14.2-14.6, 56/51-119

[56] References Cited

U.S. PATENT DOCUMENTS

| | | | |
|---|---|---|---|
| 1,928,868 | 10/1933 | Poem | 56/157 |
| 1,936,760 | 11/1933 | Hitchcock | 56/103 |
| 2,949,716 | 8/1960 | Thomson | 56/14.3 |
| 3,271,940 | 9/1966 | Ashton et al. | 56/105 |
| 3,365,867 | 1/1968 | Phillips | 56/53 |
| 3,400,524 | 9/1968 | Segredo | 56/98 |
| 3,496,708 | 2/1970 | Bornzin | 56/106 |
| 3,520,121 | 7/1970 | Ashton et al. | 56/106 |
| 3,528,234 | 1/1974 | Kowalik et al. | 56/119 |
| 3,785,130 | 7/1970 | Gaedelert | 56/98 |

FOREIGN PATENT DOCUMENTS

| | | | |
|---|---|---|---|
| 170070 | 10/1921 | United Kingdom | 56/119 |

*Primary Examiner*—Paul J. Hirsch
*Attorney, Agent, or Firm*—Larry W. Miller; Frank A. Seemar

[57] ABSTRACT

A multi-row crop header for a harvesting machine has a plurality of fore-and-aft extending row crop units, each having an elongated passageway with a front inlet opening and a rear discharge opening. The row crop units are pivotally mounted such that they can be swung toward and away from one another so as to vary the lateral distance between the inlet openings of adjacent units to thereby accommodate crops planted in various width row spacings.

11 Claims, 4 Drawing Figures

FIG. 3
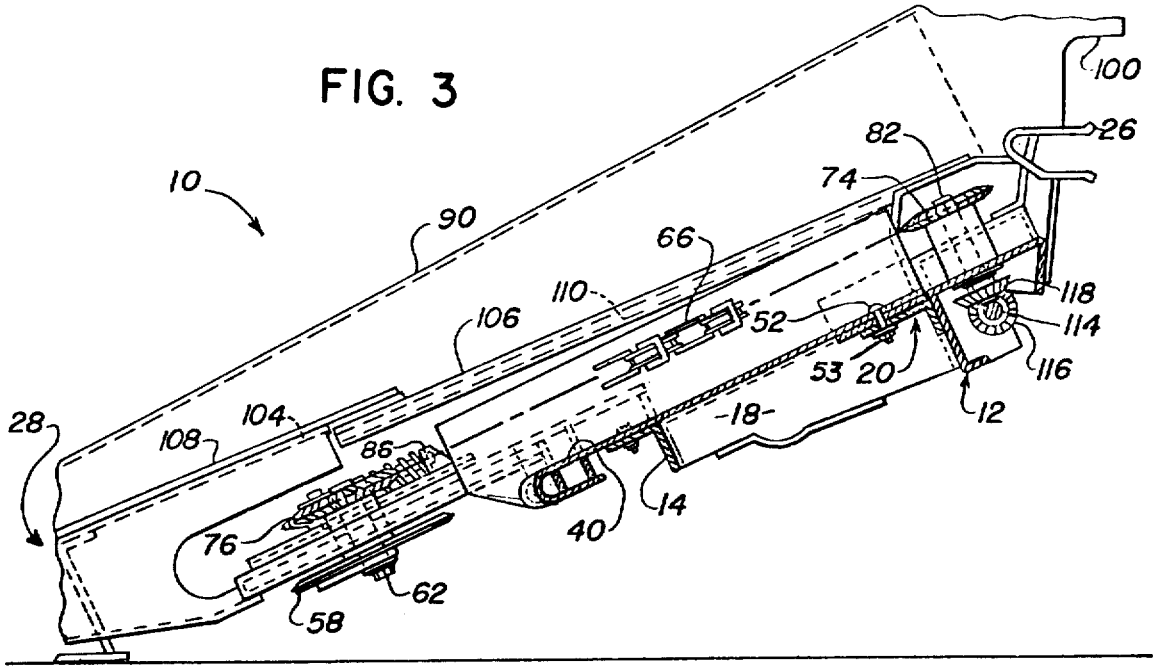
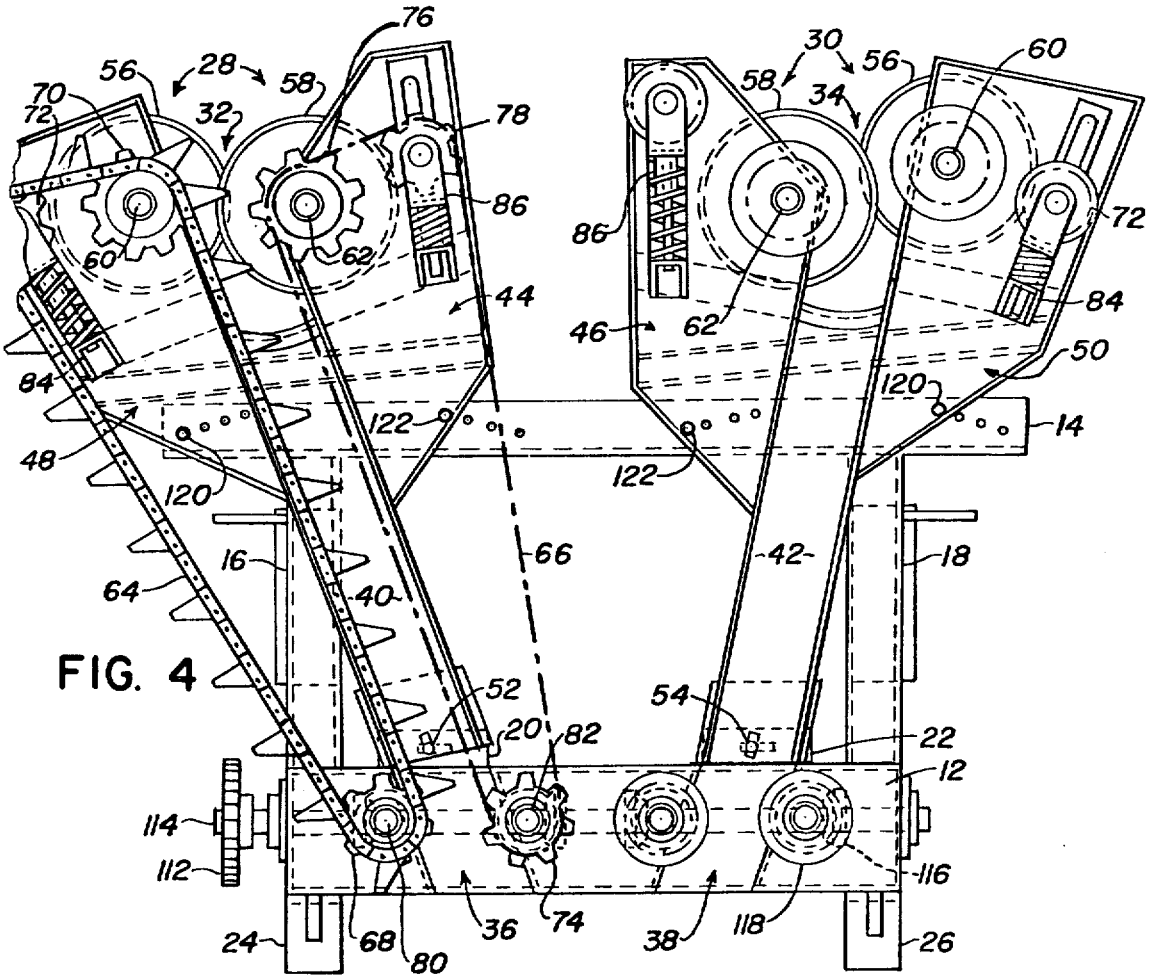
FIG. 4

ADJUSTABLE WIDTH ROW CROP HEADER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to a row crop header for a forage harvester, and, more particularly, to a multi-row crop header having a plurality of row units which can be adjusted to accommodate crops planted in various row widths.

2. Description of the Prior Art

It is common practice for farmers to plant row crops such as corn, maize, sorghum etc. in different row widths according to established farming practices and to the preference of the individual farmer. Consequently, it is advantageous for multi-row crop headers for harvesting machines to be capable of accommodating these various row width references.

Multi-row crop headers having means for changing the row spacing between the multi-row crop units so as to accommodate such variations in row width spacing have been known heretofore such as disclosed and illustrated in U.S. Pat. Nos. 1,936,760; 3,271,940; 3,520,121; 3,785,130 and 3,365,867; 3,400,524; 3,496,708; and 3,528,234. The headers disclosed in these patents are adaptable to different row widths by either transversely sliding the separate row crop units toward and away from one another to vary the row spacing therebetween in the case of the headers illustrated in some of these patents or by attaching guide components thereto to accommodate for the various row spacings as shown in some of the other patents.

However, these prior art devices are complex, inconvenient for the operator to adjust, troublesome and expensive in their structure and in the amount of time required for making the necessary row width adjustments.

SUMMARY OF THE INVENTION

The present invention obviates the disadvantages associated with the prior art devices by providing an improved multi-row crop header having a plurality of row crop units which may be pivoted toward and away from one another in order to change the spacing therebetween in conformity with various row crop widths.

Accordingly, the present invention sets forth a multi-row crop header for a harvesing machine, the header including a frame and a plurality of fore-and-aft row crop units adaptable to receive respective rows of crop as the machine advances forwardly over a field of crop planted in spaced apart rows. Each of the row crop units have an elongated passageway with a front inlet opening for receiving a row of crop and a rear discharge opening.

The row crop units are pivotally mounted on the frame for pivotal lateral movement of the row units toward and away from one another such that the lateral spacing between the adjacent inlet openings can be varied to thereby accommodate crops planted in various row widths.

The header further includes means for fastening the row crop units in a plurality of spaced row crop positions.

The present invention is also directed to the method of adjusting the row spacing between a plurality of fore-and-aft extending row crop units of a multi-row crop header to thereby accommodate the harvest of crops planted in various row widths. The method of adjusting the row spacing broadly comprises the steps of pivotally mounting one end of the row crop units on a transverse frame member, pivotally moving each of the row crop units toward and away from one another so as to adjust the lateral distance between the front inlet openings of adjacent row crop units, and fastening the row crop units in one of a plurality of row crop width positions.

Other advantages and attainments of the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description, reference will be frequently made to the attached drawings in which:

FIG. 3 is an enlarged side elevational view of the header of FIG. 1 as seen along section line 3—3.

FIG. 4 is an enlarged plan view of the header with the sheet metal fenders removed to more clearly see the structure of the row crop units, the right unit being disposed in the narrow row position whereas the left row unit is displaced in the wide row position.

DETAILED DESCRIPTION OF THE INVENTION

Figure 1:
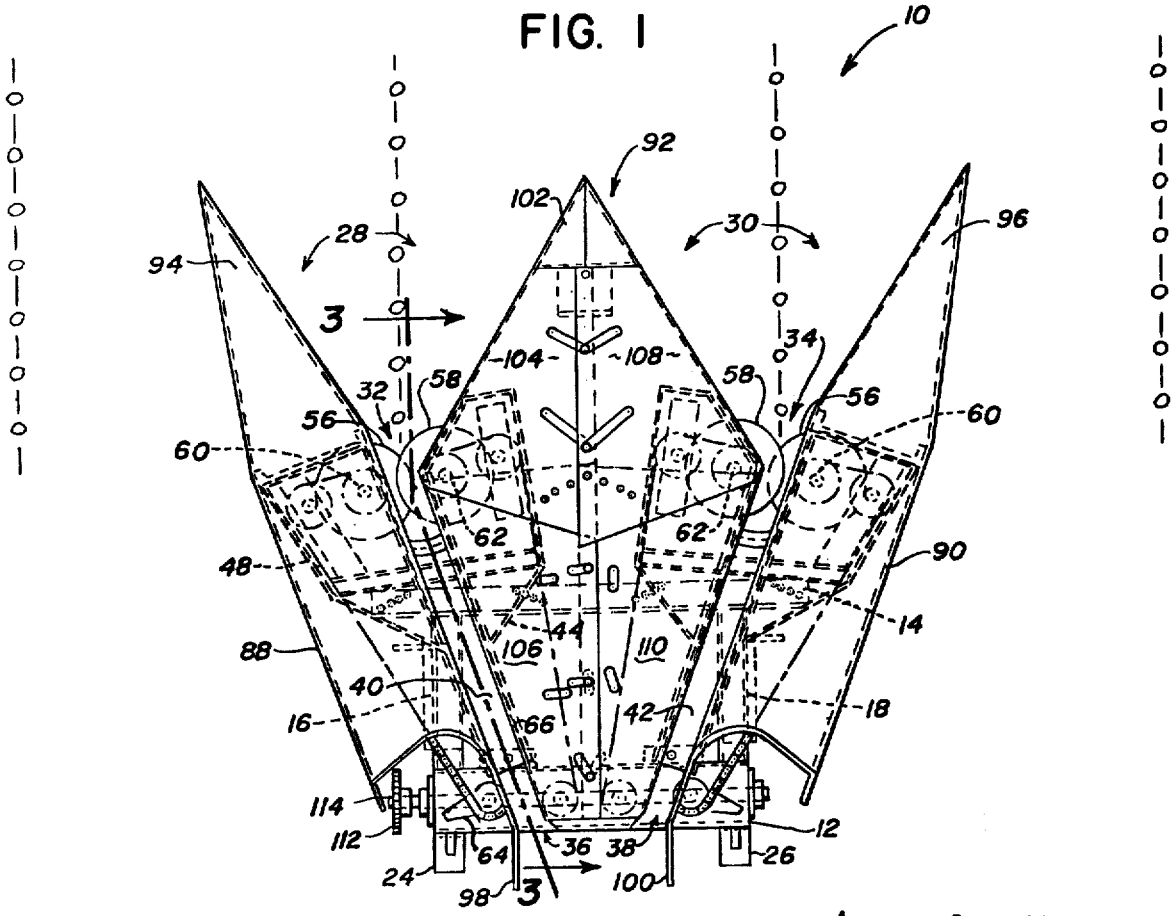
FIG. 1 is a plan view of a multi-row crop header embodying the invention and being shown in its wide row width configuration.

In the following description, right hand and left hand references are determined by standing at the rear of the machine and facing in the direction of forward travel. Also, in the following description, it is to be understood that such terms as "forward," "left," "upwardly," etc., are words of convenience and are not to be construed as limiting terms.

HEADER FRAME

Referring now to the drawings, there is shown a multi-row crop header, being indicated generally by the numeral 10, incorporating the principles of the present invention. The header 10 includes a frame having a rear transverse frame member 12, a front transverse frame member 14 and a pair of spaced apart fore-and-aft extending support legs 16,18 which connect the front frame member 14 to the rear frame member 12.

Secured to the front face of the rear transverse frame member 12 is a pair of spaced apart mounting brackets 20,22, (best seen in FIGS. 3 and 4) the purpose for which will be discussed shortly.

Secured to the rear face of the rear transverse frame member 12 is a pair of conventional attaching brackets 24,26 for attaching the header 10 to a harvesting machine, such as a forage harvester or the like.

ROW CROP UNITS

Pivotally supported on the rear transverse frame member 12 is a pair of fore-and-aft extending row crop units 28,30, each having an elongated passageway with respective front inlet openings 32,34 and respective rear discharge openings, 36,38. As best seen in FIG. 4, the row crop units 28,30 are each of a lobster claw configuration formed by respective elongated channel members 40,42 with respective inner and outer box-shaped structures 44,46 and 48,50 secured to the forward portion of the inner and outer walls of the respective channel members 40,42. The channel members 40,42 are pivotally attached at one end thereof to the respective mounting brackets 20,22 by bolts 52,54 that passes through holes defined in the bottom wall of the channel members and corresponding slots defined in the top surface of the respective brackets 20,22. On the underside of the brackets 20,22, securing nuts 53 are threaded on the respective bolts to retain the members 40,42 and thus the row crop units 28,30 on the respective mounting brackets 20,22. The elongated channel members 40,42 extend generally fore-and-aft and define the aforementioned respective passageways between the front inlet openings 32,34 and the rear discharge openings 36,38 thereof with depressions formed in the rear transverse frame member 12 serving as extensions of the rear discharge openings.

Operably associated with each of the row crop units 28,30 are severing means for severing the crop from the ground as the crop enters the inlet openings 32,34 of the respective aforementioned passageways and gathering means for conveying the severed crop rearwardly along the passageways to the respective discharge openings 36,38. The components of the severing means and the gathering means associated with the left row crop unit 28 are identical to those components associated with the right row crop unit 30, but are reversed as to their relative locations. Therefore, for the sake of brevity and convenience, only the severing and gathering components associated with the left row crop unit 28 will be described in detail.

Now, in particular reference to FIG. 4, the severing means preferably is in the form of two rotary discs 56,58 being disposed within the inlet opening 32 in an overlapping relationship to sever the crop as it enters the respective passageway. More specifically, the disc 56 is supported on the lower end of shaft 60 and disc 58 is supported in the lower end of shaft 62. Shaft 60 is journalled for rotation within a suitable bearing supported on the outer box-shaped structure 48 whereas shaft 62 is journalled for rotation within a suitable bearing supported on the inner box-shaped structure 44.

In still referring to FIG. 4, the gathering means includes outer and inner gathering chains 64,66 respectively disposed along the outboard and inboard sides of the left aforementioned passageway defined by channel member 40. The outer chain 64 is entrained around drive sprocket 68, driven sprocket 70 and idler sprocket 72 whereas the inner chain 66 is entrained around corresponding drive sprocket 74, driven sprocket 76 and idler sprocket 78. The drive sprockets 68,74 are supported on the upper ends of respective shafts 80,82 which are journalled within suitable bearings supported on rear transverse frame member 12. The driven sprockets 70,76 are supported on the upper ends of respective shafts 60,62. The idler sprockets 72,78 are supported within spring biased brackets 84,86 secured to the respective outer and inner box-shaped structures 48,44. The common function of the idler sprockets 72,78 is to take up the slack in respective chains 64,66 and thereby, maintain driving relationships between the chains 64,66 and their respective drive and driven sprockets 68,74 and 70,76. In order to fulfill these functions, the sprockets 72,78 are yieldable in a generally fore-and-aft direction as the respective row crop units 28,30 are pivoted in a horizontal plane about the vertical axes of bolts 52,54.

The header 10 is further provided with left and right outboard dividers or fenders 88,90 and a center divider 92 which is adjustable in width as the row units 28,30 are swung toward and away from one another to vary the row width spacing. The outboard fenders 88,90 are sheet metal fabrications of well known construction, sloping upwardly and rearwardly from the front to the rear of the header 10. The left outboard fender 88, associated with row unit 28, mates with the top edge of the outer wall of channel member 40 and the right outboard fender 90, associated with row unit 30, mates with the top edge of the outer wall of channel member 42. Respective pointed snouts 94,96 are mounted on the front of the outboard dividers 88,90 so as to ride along the ground between the planted rows as the header 10 advances forwardly over a field. Mounted on the adjacent inner sides of the respective outboard dividers 88,90, adjacent the rear ends thereof, are a pair of throat plates 98,100 projecting outwardly therefrom and defining the discharge throat area of the header 10.

Figure 2:
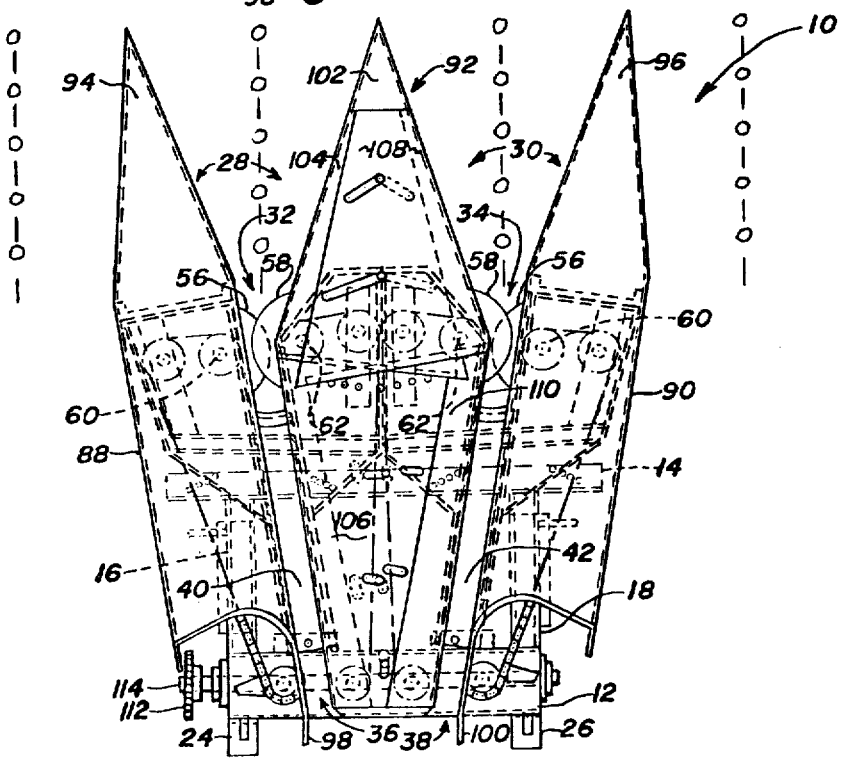
FIG. 2 is a plan view, similar to FIG. 1, of the multi-row crop header but depicted in its narrow row width configuration.

The center divider 92 is also of a sheet metal fabrication comprised of a center pointed snout 102, front and rear sheet metal panels 104,106 (associated with the respective passageway of row unit 28) and front and rear sheet metal panels 108,110 (associated with the respective passageway of row unit 30). As best seen in FIGS. 1 and 2, the front panels 104,108 are disposed in an overlapping relation and are provided with slots with fastening elements extending therethrough to fasten the panels together. Likewise, the rear panels 106,110 are disposed in an overlapping relationship and are provided with slots and fastening elements to hold them together. It is believed that a skilled artisan can readily understand the structure and the operation of the sheet metal panels 104–110 in the formation of the center divider 92. Thus, it should suffice to say that as the row units 28,30 are pivoted toward and away from one another, the corresponding front and rear panels 104,108 and 106,110 scissor over one another in a telescopic fashion to expand and contract the center divider 92 in accordance with the lateral spacing between the row units 28,30.

DRIVE MEANS

The drive for the header 10 will now be discussed in reference to FIGS. 3 and 4. The power for driving the various operating components of the header 10 is transmitted from the harvester machine to which the header 10 is to be attached through a chain (not shown) entrained around a drive sprocket (not shown) on the harvester machine and sprocket 112 supported on the left end of transversely extending drive shaft 114. Drive shaft 114 extends within transverse frame member 12 and supports vertical bevel gears 116 which driveably mate with horizontal bevel gears 118 supported on the lower ends of shafts 80,82 that support drive sprockets 68,74. The drive is such that the chains 64,66 move rearwardly along the elongated passageways and that the rotary discs 56,58 are driven in opposite directions, inwardly toward the passageways.

ROW WIDTH ADJUSTING OPERATION

In accordance with the principles of the present invention, the header 10 may be adjusted to a plurality of row width spacings between its wide row width spacing as shown in FIG. 1 and its narrow row width spacing as shown in FIG. 2.

Due to the pivotal mounting of the row units 28,30, each one can be pivoted or swung toward and away from one another so as to vary the lateral spacing or distance between the inlet openings 32,34 while the distance between the discharge openings 36,38 remains constant. This row width adjustability feature readily adapts the header 10 for harvesting of crops planted in various predetermined row widths.

The operation of adjusting the row width of the header 10 is a very simple process in that the operator first loosens the fastening elements that couple the front and rear sheet metal panels 104,108 and 106,110 together. He then removes the fastening bolts 120,122 which maintain the respective row units 28,30 in a predetermined fore-and-aft disposition, the bolts being extended through holes provided in the respective inner and outer box-shaped structures 44,46 and 48,50 and corresponding holes provided in the front traverse frame member 14. The operator next moves or pivots the row crop units 28,30 toward and away from one another to obtain the desired spacing between the inlet openings 32,34. Once the desired spacing is obtained, the operator inserts the fastening bolts 120,122 through the aforementioned holes and tightens the same to secure and maintain the respective units 28,30 in their desired fore-and-aft disposition and tightens the fastening elements on the overlapping front and rear sheet metal panels 104–110.

It is thought that the invention and many of its attendant advantages will be understood from the foregoing description and it will be apparent that various changes may be made in form, construction and arrangement thereof without departing from the spirit and scope of the invention or sacrificing all of its material advantages, the form hereinbefore described being merely a preferred or exemplary embodiment thereof.

Having thus described the invention, what is claimed is:

1. A multi-row crop header for a harvesting machine comprising:

(a) a frame;

(b) a plurality of fore-and-aft row crop units adaptable to receive respective rows of crop as the machine advances forwardly over a field of crop planted in spaced apart rows, each row crop unit having an elongated passageway with a front inlet opening for receiving a row of crop and a rear discharge opening, *said elongated passageway being defined by a channel member extending between said front inlet opening and said rear discharge opening;*

(c) means for pivotally mounting each row crop unit individually on said frame for [laterally] *lateral* movement relative to the forward direction of travel whereby the lateral spacing between said front inlet openings of said respective row crop units may be varied to receive rows of crop planted in a plurality of different row widths [and], *said means for mounting including a mounting bracket affixed to said frame, each said channel member having a rearward end adjacent to the corresponding rear discharge opening, said rearward end of each said channel member being pivotally attached to the corresponding mounting bracket;*

(d) means for fastening said respective row crop units in a plurality of laterally spaced positions corresponding to said plurality of different row widths[.]*;*

*(e) gathering means associated with each of said row crop units for conveying crop rearwardly toward said rear discharge opening, said gathering means including a pair of drive sprockets, a pair of driven sprockets and a pair of idler sprockets, said drive sprockets being rotatably mounted on said frame and being disposed on opposite sides of each of said elongated passageways proximate to said rear discharge opening, said drive sprockets being mounted in a fixed position relative to said frame, said driven sprockets being mounted on opposite sides of each of said elongated passageways adjacent said front inlet opening, each said gathering means further including a pair of flexible elements operable positioned on opposing sides of said elongated passageway, each said flexible element cooperating with the corresponding drive sprocket, driven sprocket and idler sprocket to engage crop material and convey it rearwardly along said passageway; and*

*(f) drive means for powering said drive sprockets.*

[2. A multi-row crop header as described in claim 1, further comprising gathering means associated with each of said row crop units, said gathering means including a pair of drive sprockets, a pair of driven sprockets and a pair of idler sprockets, said drive sprockets being mounted on said frame and being disposed on opposite sides of each of said elongated passageways adjacent the discharge openings, said driven sprockets being mounted on opposite sides of said elongated passageways adjacent said inlet openings, said gathering means further including a pair of gathering chains, each chain being entraned around one of said drive sprockets and one of said driven sprockets and further around one of said idler sprockets.]

3. A multi-row crop header as described in claim 1, wherein said idler sprockets are yieldably mounted so as to maintain a driving relationship between said drive sprockets and said driven sprockets as each of said row crop units is pivotably moved on said frame.

[4. A multi-row crop header as described in claim 1, wherein said frame includes a front transverse frame member and a rear transverse frame member, said row crop units being pivotally mounted on said rear transverse frame member and said fastening being operable for fastening said row crop unit to said front transverse frame member at a plurality of spaced apart positions.]

[5. A multi-row crop header for a harvesting machine adapted to harvest rows of crop, said header comprising:

(a) a plurality of generally fore-and-aft extending row crop units each having an elongated passageway adapted to receive one of a plurality of rows of crop planted in a predetermined row width;

(b) each of said row crop units being individually mounted about a vertical axis for separately pivoting said unit in a generally horizontal plane; and (c) means for separately fastening each of said row crop units in any one of a plurality of pivotally displaced positions whereby the elongated passageway of each row unit it adapted to receive one of a plurality of rows of crop planted in a row width different from said predetermined row width.]

[6. The multi-row crop header as described in claim 5 wherein said header includes a frame having a front transverse member and a rear transverse member, said row crop units being pivotally mounted at one end to said rear transverse frame member.]

[7. The multi-row crop as described in claim 6 further comprising means for separately fastening said row crop units at a plurality of spaced apart positions along said front transverse frame member.]

*8. The multi-row crop header of claim 3 wherein the pivot attaching each respective said channel member to said mounting bracket is selectively laterally positionable.*

*9. The multi-row crop header of claim 8 wherein each said mounting bracket includes a slot-shaped hole therein for receiving said pivot for selective lateral movement therewithin, said pivot including means for locking said pivot into a selected position within said slot-shaped hole.*

*10. The multi-row header of claim 8 wherein said frame includes a front transverse member and a rear transverse member, said mounting brackets being affixed to said rear transverse member.*

*11. The multi-row header of claim 10 wherein said front transverse frame member includes a plurality of holes therein, each said row unit having at least one opening therein alignable with at least one of said holes in said front transverse frame member, said means for fastening including a locking member cooperable with said at least one opening and any hole aligned therewith to lock said row unit into a fixed position relative to said front transverse frame member.*

*12. A multi-row header for a mobile harvesting machine comprising:*

*a frame including a first transversely extending member;*

*least two fore-and-aft extending row crop units, each row crop having a front inlet opening, a rear discharge opening and a generally longitudinally extending channel member defining a passageway between said front inlet opening and said rear discharge opening, each row crop unit being operable to harvest a row of crop material,*

*means for pivotally mounting each said row crop unit for independent lateral movement such that each said front inlet opening can be selectively positioned relative to an adjacent front inlet opening to accommodate row crops planted in various row widths without lateral displacement of said rear discharge opening, said means for mounting including a mounting bracket affixed to said first transverse frame member, each said channel member having a rearward end proximate to the corresponding said rear discharge opening, each respective said rearward end being pivotally attached to the corresponding mounting bracket;*

*means for separately fastening each said row crop unit in any one of a plurality of pivotally displaced positions corresponding to said various row crop spacings;*

*gathering means corresponding to each said row crop unit for conveying crop material along said passageway toward said rear discharge opening; and*

*drive means for powering each said gathering means, said drive means including a plurality of drive shafts connected to said gathering means, said drive shafts being rotatably mounted on said frame in a fixed relationship to said first transverse frame member.*

*13. The multi-row header of claim 12 wherein each said channel member has a U-shaped cross-sectional configuration.*

*14. The multi-row header of claim 12 wherein each said gathering means includes a pair of drive sprockets, a pair of driven sprockets, a pair of idler sprockets and a pair of flexible elements, each said flexible element being entrained around one of said driven sprockets, one of said idler sprockets and one of said drive sprockets in a driving relationship therewith, said flexible elements further being disposed on opposite sides of said elongated passageway and at least partially operable therewithin to convey crop material rearwardly toward said rear discharge opening, each of said drive sprockets being affixed to a corresponding drive shaft in a fixed relationship to said first transverse frame member.*

*15. The multi-row header of claim 14 wherein said idler sprockets are yieldably mounted so as to maintain a driving relationship between said drive sprockets and said driven sprockets.*

*16. The multi-row header of claim 15 wherein the pivot attaching each respective said channel member to the corresponding said mounting bracket is selectively laterally positionable.*

* * * * *